United States Patent [19]

Arai et al.

[11] 4,027,926
[45] June 7, 1977

[54] ANTI-SKID CONTROL SYSTEM FOR VEHICLES

[75] Inventors: Hiroshi Arai, Toyota; Akira Nakamura, Susono; Akio Sugiura, Nagoya; Atutoshi Okamoto, Toyohashi; Koichi Toyama, Kariya, all of Japan

[73] Assignees: Nippondenso Co., Ltd., Kariya; Toyota Jidosha Kogyo Kabushiki Kaisha, Toyota, both of Japan

[22] Filed: Apr. 30, 1975

[21] Appl. No.: 573,151

[30] Foreign Application Priority Data

May 13, 1974 Japan .............. 49-53623

[52] U.S. Cl. ..................... 303/109; 188/181 C
[51] Int. Cl.² ................................... B60T 8/10
[58] Field of Search .......... 188/181 C; 303/20, 21, 303/106, 109; 307/10 R; 317/5; 324/161; 340/53, 62

[56] References Cited
UNITED STATES PATENTS

| | | | |
|---|---|---|---|
| 3,525,553 | 8/1970 | Carp et al. | 303/21 P |
| 3,578,819 | 5/1971 | Atkins | 303/21 BE |
| 3,650,575 | 3/1972 | Okamoto | 188/181 C X |
| 3,724,903 | 4/1973 | Okamoto et al. | 303/21 BE X |
| 3,825,799 | 7/1974 | Matsumura | 317/5 |
| 3,834,770 | 9/1974 | Fleischer et al. | 303/21 P |
| 3,857,613 | 12/1974 | Arikawa | 303/21 BE |
| 3,861,756 | 1/1975 | Arikawa | 303/21 BE |

Primary Examiner—Stephen G. Kunin
Attorney, Agent, or Firm—Cushman, Darby & Cushman

[57] ABSTRACT

An anti-skid control system for preventing skidding of a vehicle caused by the braking of the vehicle while it is in motion in the system when a vehicle speed signal generated from vehicle speed detecting apparatus becomes lower than a predetermined value, discriminating apparatus generates a discrimination signal and the braking pressure applied to the wheel is modulated through limiting apparatus including a logical gate and controlled by the discrimination signal. On the other hand, when the vehicle body speed becomes lower than a predetermined value, the generation of the discrimination signal is prevented by a deceleration sensor, thus suitably controlling the braking pressure in accordance with the surface conditions of the road.

13 Claims, 3 Drawing Figures

ANTI-SKID CONTROL SYSTEM FOR VEHICLES

BACKGROUND OF THE INVENTION

1. Field of the Invention

The present invention relates to an anti-skid control system for vehicles which is capable of preventing skidding of a vehicle caused by the locking of the wheels when the running vehicle is braked and the braking pressure applied to the wheels exceeds a certain value determined by the coefficient of friction between the wheels and the road surface.

2 Description of the Prior Art

Conventional anti-skid control systems of the above type are designed for accomplishing a real time control in which the speed of a vehicle body is detected to maintain the wheel speed at a value lower then the vehicle body speed by for example about 20%, and a predictive control is accomplished in which the wheel speed for example is detected to prevent locking of the wheels. In other words, to prevent locking of the wheels due to the excessively applied braking pressure, the wheel speed immediately before the braking of the vehicle is stored and at the same time this wheel speed is gradually decreased in accordance with predetermined control patterns to obtain a reference speed representing a pseudo vehicle speed which is in turn compared with the actual wheel speed to prevent locking of the wheels. On the other hand, the predictive control is accomplished in such a manner that the surface condition of the road is determined by a deceleration sensor (hereinafter referred to as a G sensor) and a plurality of control patterns are predetermined, whereby the braking pressure is varied in accordance with the result of the determination by the G sensor to always suit the coefficient of friction between the road surface and the wheels. A disadvantage of the conventional system of this construction is that as the vehicle speed decreases, noise due to the wheel speed increases thus frequently causing erroneous controls at low vehicle speeds.

SUMMARY OF THE INVENTION

With a view to overcoming the foregoing difficulty, it is an object of the present invention to provide an anti-skid control system for vehicles wherein when a vehicle speed signal corresponding to the speed of a vehicle body drops below a predetermined value, a discrimination signal is generated to limit the modulation of the braking pressure in anti-skid control operation thus preventing erroneous control operations at low vehicle speeds and always ensuring a stable anti-skid control operation.

In accordance with the present invention, by preventing the braking pressure from being released erroneously by noise due to the wheel speed at low vehicle speeds, the braking pressure is always modulated with a high degree of stability to accomplish the proper anti-skid control, and moreover a pseudo vehicle speed detecting circuit can be used for both the essential anti-skid control purposes and the prevention of erroneous operations at low vehicle speeds. In addition, it is possible to positively prevent locking of the wheels on the road surfaces having low friction coefficients and hence a higher tendency to cause locking of the wheels at low vehicle speeds, while the undesired braking pressure releasing operation at low vehicle speeds on the road surfaces having high friction coefficients is also prevented, thus accomplishing the proper anti-skid control to suit the road surface conditions.

DESCRIPTION OF THE PREFERRED EMBODIMENTS

The present invention will now be described in greater detail with reference to the illustrated embodiments.

Figure 1:
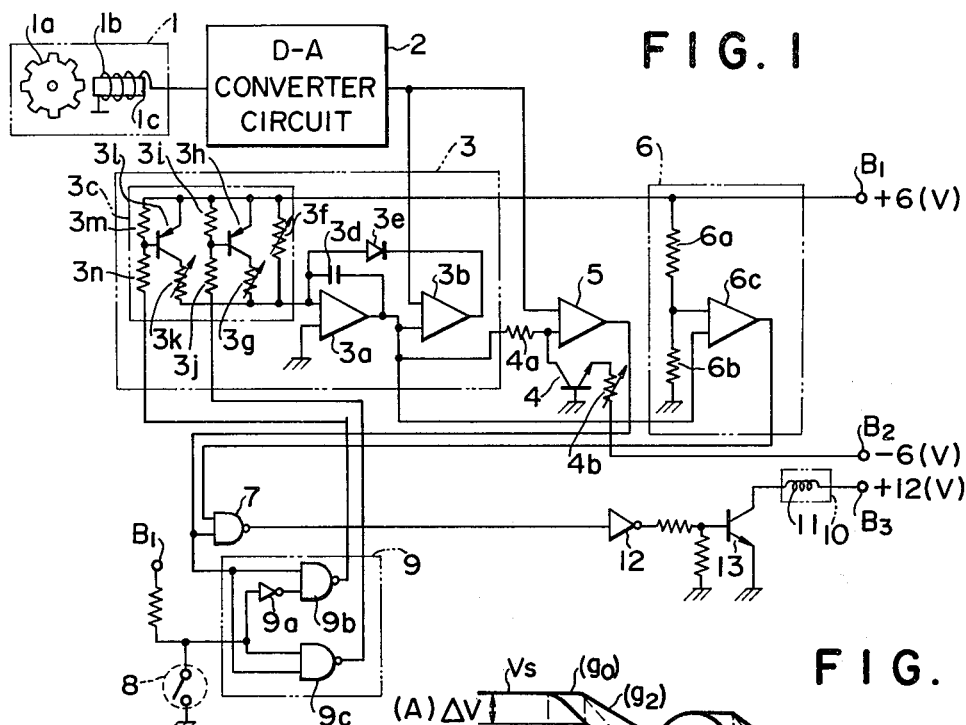
FIG. 1 is a wiring diagram showing an embodiment of anti-skid control system for vehicles according to the present invention.

Referring to FIG. 1 illustrating a wiring diagram of an embodiment of anti-skid control system for vehicles according to the present invention, numeral 1 designates a wheel speed sensor for generating pulse signals of a frequency proportional to the wheel speed, 1a a rotary member made from a magnetic material mounted on a rotary shaft such as the axile correlated to the rotation of the wheel and having a plurality of projections formed on its outer periphery, 1b a generating coil wound on a permanent magnet 1c and arranged adjacent to the outer periphery of the rotary member 1a whereby the magnetic flux through the generating coil 1b is varied in accordance with the rotation of the rotary member 1a so that an AC voltage having a frequency corresponding to the wheel speed is induced across the generating coil 1b and the output signals are delivered to the output terminal. Numeral 2 designates a D-A converter circuit whereby the pulse signals from the wheel sensor 1 are subjected to D-A conversion for generating a DC voltage proportional to the wheel speed, and the D-A converter circuit 2 may for example be a known type of integrating circuit. Numeral 3 designates a pseudo vehicle speed generating circuit whereby the wheel speed just prior to the application of brakes is gradually decreased in accordance with a predetermined control pattern to simulate the vehicle speed. The pseudo vehicle speed detecting circuit 3 comprises an integrating circuit operational amplifier 3a, a comparator 3b, a deceleration presetting circuit 3c, a capacitor 3d and a diode 3e, whereby when the DC output voltage of the D-A converter circuit 2 (hereinafter referred to as a wheel speed voltage) is increasing or in a predetermined steady state, the comparator 3b charges the capacitor 3d through the diode 3e in such a manner that the output voltage of the integrating circuit including the integrating circuit operational amplifier 3a and the capacitor 3d becomes equal to the wheel speed voltage, whereas when the wheel speed is decreasing the charging of the capacitor 3d is stopped and the charge on the capacitor 3d is discharged through transistors 3h and 3l and a resistor 3f in accordance with the preset decelerations determined by the deceleration presetting circuit 3c. Consequently, a voltage corresponding to a reference speed representing the pseudo vehicle speed (hereinafter referred to as a reference speed voltage) is generated across the terminals of the capacitor 3d. The pseudo vehicle speed detecting circuit 3 is also used as vehicle speed detecting means for generating a vehicle speed signal corresponding to the vehicle body speed. The deceleration presetting circuit $3c$ comprises the variable resistors $3f$, $3g$ and $3k$, the transistors $3h$ and $3l$ and bias resistors $3i$, $3j$, $3m$ and $3n$ whereby a first preset deceleration $g_0$ is preset by the variable resistor $3f$, a second preset deceleration $g_1$ is preset by the variable resistor $3g$ and a third decelerationg $g_2$ is preset by the variable resistor $3k$.

The operation of control pattern changing which results in the changing of the first, second and third preset decelerations is performed by a pattern changing circuit which will be described latter. Numeral $4a$ designates a resistor for subtracting from the reference speed voltage a voltage corresponding to a speed difference $\Delta V$, and a current regulator circuit including a transistor 4 is provided to maintain a constant current flow through the resistor $4a$ and thereby to maintain the voltage corresponding to the speed difference $\Delta V$ at a predetermined value, with the value of the current flowing through the resistor $4a$ being dependent on the resistance value of a variable resistor $4b$. Numeral 5 designates a comparator for comparing the wheel speed voltage and a voltage corresponding to the reference speed voltage minus the speed difference $\Delta V$, so that when the former is smaller than the latter the output signal of the comparator 5 changes from 0 to 1 and a braking pressure releasing 1 signal is generated. When the braking pressure releasing signal is generated thus causing the wheel speed voltage to rise and become greater than or equal to the reference speed voltage, the output signal of the comparator 5 changes from 1 to 0 so that the braking pressure releasing signal is terminated and a braking pressure restoring signal is generated. In this way, the braking pressure releasing signal and the braking pressure restoring signal are respectively generated at the output terminal of the comparator 5 as 1 signal and a 0 signal. Symbol $B_1$ designates +6 volt power supply teminals, $B_2$ a —6 volt power supply terminal. Numeral 6 designates a vehicle speed comparison circuit constituting discriminating means for generating a discrimination signal when the vehicle speed signal consisting of the reference speed signal becomes lower than a predetermined value. The vehicle speed comparison circuit 6 comprises resistors $6a$ and $6b$ and a comparator $6c$ whereby the divided voltage by the resistors $6a$ and $6b$ and the reference speed voltage are compared with each other to generate a discrimination signal at the output of the comparator 6 which changes from 1 to 0 when the former voltage becomes greater than the latter. This divided voltage is the one which has the previously mentioned predetermined value corresponding to a predetermined vehicle speed (e.g., 10 Km/h).

Numeral 7 designates a NAND circuit constituting limiting means for performing the NAND operation on the braking pressure releasing signal and the discrimination signal and limiting the modulation of the braking pressure while the discrimination signal remains on. Numeral 8 designates a deceleration sensor (G sensor) which is brought into operation in response to a deceleration greater than a preset value, e.g., a deceleration of 0.5 g or greater, 9 a pattern changing circuit for suitably changing the control patterns of the reference speed to correspond to any one of the first, second and third preset decelerations $g_0$, $g_1$ and $g_2$ and including a NOT circuit $9a$ and NAND circuits $9b$ and $9c$. The control pattern changing is accomplished in accordance with the output signal of the pattern changing circuit 9. In other words, when the braking pressure releasing signal is generated and the signal at the output terminal of the comparator 5 changes to 1, if at this time the G sensor 8 is in the non-operated position, both of the input signals to the NAND circuit $9c$ change to 1 causing its output signal to change from 1 to 0, and the transistor $3h$ is rendered conductive causing a reference speed $V_S$ to show the discharging characteristic which is determined by the second preset deceleration $g_1$. On the other hand, if the G sensor 8 is in the operated position when the braking pressure releasing signal is generated, both of the input signals to the NAND circuit $9b$ change to 1 causing its output signal to change from 1 to 0, and the transistor $3l$ is rendered conductive causing the reference speed $V_S$ to show the discharging characteristic which is determined by the third preset deceleration $g_2$.

Numeral 10 designates braking pressure modulating means for modulating the braking pressure applied to the wheel through electromagnetic operation, whose mechanical construction is not shown and represented by its electromagnetic coil 11 alone. When the electromagnetic coil 11 is not energized, the driver of the vehicle is not prevented from performing the artificial braking operation by suitably depressing the brake pedal thus permitting the driver to perform the normal braking operation, whereas when the electromagnetic coil 11 is energized by the current supplied by the braking pressure releasing signal the electromagnetic force of the electromagnetic coil 11 operates for example a three-way valve and servo means is also actuated thus forcibly reducing the braking pressure applied to the wheel even if the brake pedal is depressed by the driver. Numeral 13 designates a power transistor for switching on and off the current flow to the electromagnetic coil 11, whose base is connected to the output terminal of a NOT circuit 12. The electromagnetic coil 11 has its one end connected to a power supply terminal $B_3$ (+12 volts).

Figure 2:
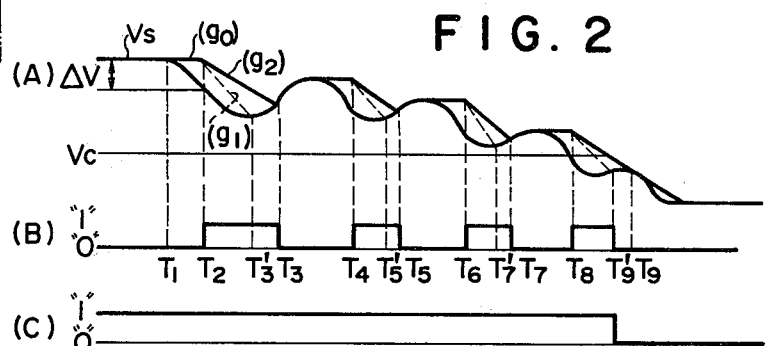
FIG. 2 illustrates characteristic diagrams (A)-(C) useful in explaining the operation of the embodiment shown in FIG. 1.

With the construction described above, the operation of the system according to the first embodiment of the invention will now be described with reference to the characteristic diagram shown in FIG. 2. FIG. 2 graph (A) shows the variations of wheel speed $V_W$ and reference speed $V_S$ with time, FIG. 2 graph (B) shows the waveform of the braking pressure releasing signal, and FIG. 2 graph (C) shows the waveform of the discrimination signal generated from the vehicle speed comparison circuit 6. When a braking pressure is applied to the wheel, the wheel speed $V_W$ decreases with a deceleration which is determined by the magnitude of the applied braking pressure and the reference speed $V_S$ decreases in accordance with the predetermined control patterns. When the wheel speed $V_W$ drops below a value obtained by subtracting the speed difference $\Delta V$ from the reference speed $V_S$, a braking pressure releasing signal is generated and the braking pressure modulating means 10 is actuated by the braking pressure releasing signal to forcibly reduce the braking pressure applied to the wheel. When the wheel speed $V_W$ eventually increases again and becomes equal to the reference speed $V_S$, the braking pressure releasing signal is terminated and a braking pressure restoring signal is generated to reapply the braking pressure to the wheel. The control patterns of the reference speed $V_S$ are such that depending on the decelerations of the wheel, the reference speed $V_S$ decreases with for example the first present deceleration $g_0$ (1.0 g) and the second deceleration $g_1$ (4.0 g) or the third deceleration $g_2$ (2.0 g).

Here, a letter g designates the gravity of the earth. As shown in FIG. 2 graph (A), at least two control patterns are preset for the reference speed $V_S$ and the control patterns are changed in accordance with the output signal of the G sensor 8. In other words, the control patterns of the reference speed $V_S$ are changed depending on whether the vehicle deceleration is greater or smaller than a predetermined deceleration of 0.5 g, for example. When, at a time $T_1$ in FIG. 2 graph (A), the brake pedal is depressed thus applying a braking pressure to the wheels, the wheel speed $V_W$ drops with a deceleration corresponding to the applied braking pressure and the reference speed $V_S$ drops with the first preset deceleration $g_0$. As the wheel speed $V_W$ eventually drops at a time $T_2$ below the value corresponding to the reference speed $V_S$ minus the speed difference $\Delta V$, as shown in FIG. 2 graph (B), the braking pressure releasing signal or 1 signal is generated and the braking pressure modulating means 10 is actuated to forcibly reduce the braking pressure applied to the wheels. The reference speed $V_S$ drops with either the second preset deceleration $g_1$ or the third preset deceleration $g_2$ during the time between the generation of the braking pressure releasing signal at the time $T_2$ and the generation of a braking pressure restoring signal or 0 signal. In this case, whether the reference speed $V_S$ drops with the second preset deceleration $g_1$ or the third preset deceleration $g_2$ is determined in accordance with the output signal of the G sensor 8. The braking pressure restoring signal will be generated when the wheel speed $V_W$ increasing again in response to the generation of the braking pressure releasing signal becomes equal to the reference signal $V_S$ at a time $T_3$ or $T_3'$. Thereafter, as the wheel speed $V_W$ increases further, the reference speed $V_S$ starts to increase along with the wheel speed $V_W$. Then, at a time $T_4$ in the next cycle following the generation of the braking pressure restoring signal at the time $T_3$ or $T_3'$, the braking pressure restoring signal is terminated and the braking pressure releasing signal is again generated. This control process is repeated while the wheel speed is decreasing so that when the reference speed reaches a predetermined value $V_C$, the output signal of the comparator 6 changes from 1 to 0 and the 0 signal is applied to one input of the NAND circuit 7. As a result, the gate is inhibited and the output signal of the comparator 5 is inhibited by the gate to prevent its delivery to the following stage. Consequently, the braking pressure releasing signal tending to remain on up to a time $T_9$ is terminated upon generation of a discrimination signal at a time $T_9'$. In this way, the modulation of the braking pressure at lower vehicle speeds is limited.

Figure 3:
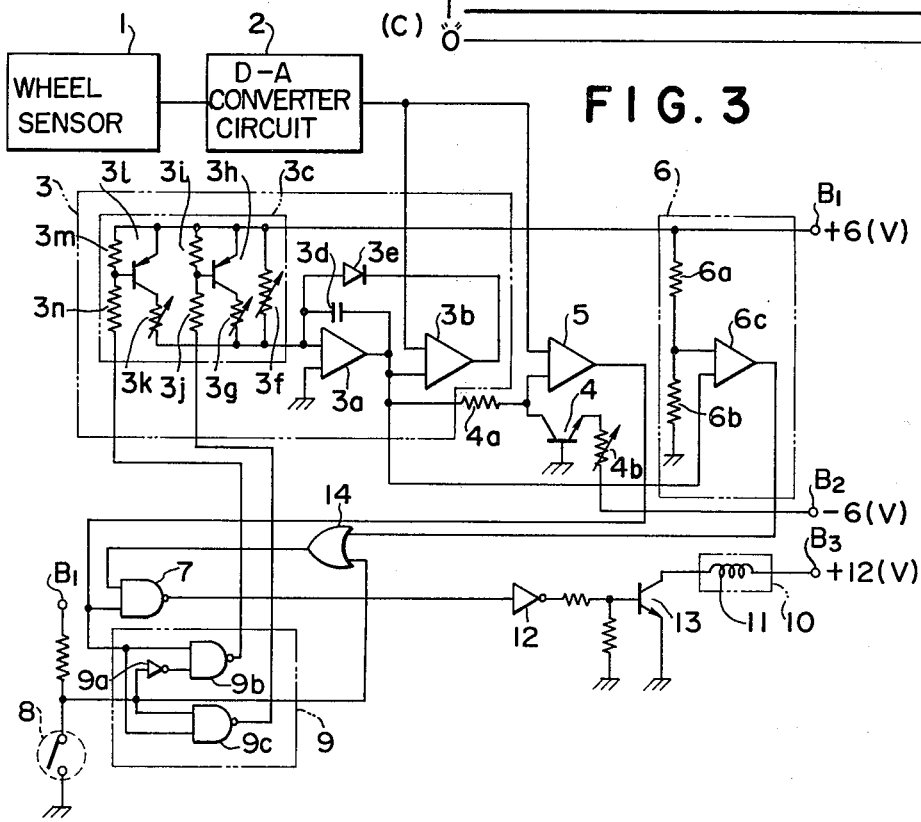
FIG. 3 is a wiring diagram showing another embodiment of the system according to the present invention.

Referring now to FIG. 3, there is illustrated a wiring diagram of another embodiment of the system according to the invention. In FIG. 3, the component parts which are identical or equivalent to those shown in FIG. 1 are designated by the like reference numerals and only different parts will be described. In other words, the second embodiment is designed so that instead of interrupting the braking pressure releasing signal in all cases when the reference speed drops below the predetermined value $V_C$, the discrimination signal for interrupting the braking pressure releasing signal on the road surfaces having high friction coefficients is transmitted to the NAND circuit 7, while the transmission of the discrimination signal to the NAND circuit 7 is prevented on the road surfaces having low friction coefficients so as not to interrupt the braking pressure releasing signal. For this purpose, an OR circuit 14 is additionally provided.

Since the G sensor 8 is maintained in the nonoperated position on the road surfaces having low friction coefficients, a 1 signal is applied to the OR circuit 14 thus preventing the transmission of the discrimination signal from the comparator 6c to the NAND circuit 7. Consequently, on a high friction coefficient road surface, the discrimination signal is interrupted at low vehicle speeds below the predetermined value thus preventing the occurrence of any erroneous operation without any detrimental effect on the intended reduction of the braking distance, while on a low friction coefficient road surface which is highly conductive to locking of the wheels at low vehicle speeds below the predetermined value, the braking pressure is modulated without any restriction in accordance with the braking pressure releasing signal thus accomplishing the anti-skid control efficiently. It is of course possible to use a greater fourth preset deceleration on such low friction coefficient road surfaces so that the reference speed decreases in accordance with this fourth preset deceleration to reduce the frequency of occurrence of the braking pressure releasing signal.

While, the preset invention has been illustrated and described as embodied in an anti-skid control system of the type wherein the pseudo vehicle speed detecting circuit 3 for providing an anti-skid controlling pseudo vehicle speed is used as vehicle speed detecting means, the present invention may equally be applied to any other types of system such as one which is based on the method of differentiating the wheel speed.

Further, the vehicle speed detecting means is not limited to the pseudo vehicle speed detecting circuit 3, since any other means capable of generating a vehicle speed signal corresponding to the vehicle speed such as one employing radar means for detecting speed of a vehicle body may be equally used.

Still further, while, in the embodiments of the invention described above, the NAND circuit 7 which interrupts the braking pressure releasing signal is used as means for limiting the modulation of the braking pressure in response to the discrimination signal from discriminating means, the present invention is not limited to the NAND circuit 7. For example, the discrimination signal may be used to forcibly adjust the output signal of the stage preceding the comparator 5 and thereby to limit the generation of the braking pressure releasing signal, or the discrimination signal may be used to interrupt the power supply to the electromagnetic coil 11, or the discrimination signal may be used to render the braking pressure modulation means 10 mechanically inoperative, or alternately it is possible to provide a by-pass line in parallel to the braking pressure modulating means 10 and a by-pass valve for opening the by-pass line in response to the discrimination signal. In short, any means may be used provided that it is capable of limiting the modulation operation which releases the braking pressure.

What is claimed is:

1. In an anti-skid control system for a vehicle comprising a wheel sensor for detecting the rotational speed of a wheel of a vehicle in motion, locking decision means connected to said wheel sensor for detecting when said wheel is on the verge of locking in accordance with an output signal of said wheel sensor and generating a braking pressure releasing signal, and braking pressure modulating means connected to said locking decision means and responsive to said braking pressure releasing signal for modulating the braking pressure applied to said wheel to eliminate the application of excessive braking pressure, the improvement comprising:

vehicle speed detecting means for generating a vehicle speed signal corresponding to the vehicle body speed of said vehicle in motion;

auxiliary means connected to said vehicle speed detecting means for limiting the modulation of the braking pressure by said braking pressure modulating means when said vehicle speed signal becomes lower than a predetermined value;

a deceleration sensor for detecting the deceleration of the vehicle body of said vehicle; and inhibiting means connected to said deceleration sensor for inhibiting operation of said auxiliary means when a detecting vehicle deceleration signal becomes lower than a predetermined level.

2. A system according to claim 1, wherein said vehicle speed detecting means includes a pseudo vehicle speed detecting circuit connected to said wheel sensor whereby the output signal of said wheel sensor is temporarily stored just before the braking of said vehicle, and said stored output signal is gradually decreased in accordance with a plurality of preset control patterns to simulate the actual speed of the vehicle body of said vehicle during the braking thereof.

3. A system according to claim 1, wherein when the deceleration of the vehicle body of said vehicle becomes lower than a predetermined value, said deceleration sensor generates an output signal for selecting the control pattern having a steeper slope.

4. A system according to claim 1, wherein said auxiliary means includes discriminating means connected to said vehicle speed detecting means for generating an discrimination signal when said vehicle speed signal becomes lower than a predetermined value, and limiting means connected to said discriminating means for receiving said discrimination signal to limit the modulation of the braking pressure by said braking pressure modulating means.

5. A system according to claim 4, wherein said limiting means includes a limiting logical circuit connected to said discriminating means and said locking decision means for preventing the passage of said braking pressure releasing signal therethrough in response to the generation of said discrimination signal.

6. A system according to claim 4, wherein said inhibiting means comprises an inhibiting logical circuit for inhibiting the discrimination signal from said discriminating means by the detected signal from said deceleration sensor when the deceleration of the vehicle body of said vehicle becomes lower than a predetermined value.

7. In an anti-skid control system for a vehicle comprising a wheel sensor for detecting the rotational speed of a wheel of a vehicle in motion, a pseudo vehicle speed detecting circuit connected to said wheel sensor for simulating, in accordance with an output signal of said wheel sensor, the actual vehicle body speed of said vehicle during the braking thereof, a comparing circuit connected to said pseudo vehicle speed detecting circuit and said wheel sensor for comparing the output signals thereof and detecting when said wheel is on the verge of locking to generate a braking pressure releasing signal, and braking pressure modulating means connected to said comparing circuit and responsive to said braking pressure releasing signal for modulating the braking pressure applied to said wheel and eliminating the application of excessive braking pressure, the improvement comprising:

auxiliary means connected to said pseudo vehicle speed detecting circuit for limiting the modulation of the braking pressure by said braking pressure modulating means when an output vehicle speed signal of said pseudo vehicle speed detecting circuit becomes lower than a predetermined value;

a deceleration sensor for detecting the deceleration of the vehicle body of said vehicle; and inhibiting means connected to said deceleration sensor for inhibiting operation of said auxiliary means when a detected vehicle deceleration signal becomes lower than a predetermined value.

8. In an anti-skid control system for a vehicle comprising a wheel sensor for detecting the rotational speed of a wheel of a vehicle in motion, locking decision means connected to said wheel sensor for detecting when said wheel is on the point of locking in accordance with the output signal of said wheel sensor and generating a braking pressure releasing signal, and braking pressure modulating means connected to said locking decision means and responsive to said braking pressure releasing signal for modulating the braking pressure applied to said wheel to eliminate the application of excessive braking pressure, the improvement comprising:

comparison means for generating a comparison signal when the rotational speed of the vehicle in motion becomes lower than a predetermined level;

a deceleration sensor for generating a detecting signal when the deceleration of the vehicle body of said vehicle becomes lower than a predetermined level; and circuit means connected to said comparison means and said deceleration sensor for limiting modulation of said braking pressure modulating means by the comparison signal and for inhibiting the limitation of modulation of said braking pressure modulating means by the detecting signal.

9. A system according to claim 8 wherein said circuit means comprises a limiting logical circuit for interrupting the braking pressure releasing signal by the comparison signal; and inhibiting means for inhibiting operation of said limiting logical circuit by the detecting signal.

10. A system according to claim 9 wherein said inhibiting means includes an inhibiting logical circuit for inhibiting application of the comparison signal to said limiting logical circuit by the detecting signal.

11. In an anti-skid control system for a vehicle comprising a wheel sensor for detecting the rotational speed of a wheel of a vehicle in motion, locking decision means connected to said wheel sensor for detecting when said wheel is on the verge of locking in accordance with an output signal of said wheel sensor and generating a braking pressure releasing signal, and braking pressure modulating means connected to said locking decision means and responsive to said braking pressure releasing signal for modulating the braking pressure applied to said wheel to eliminate the application of excessive braking pressure, the improvement comprising:

auxiliary means for limiting modulation of the braking pressure by said braking pressure modulating means when the rotational speed of the vehicle in motion becomes lower than a predetermined value; and correction means for eliminating operation of said auxiliary means by detecting a low coefficient of friction between a road surface and the wheel when the wheel is braked.

12. A system according to claim 11 wherein said correction means includes friction detecting means for detecting the coefficient of friction between a road surface and the wheel when the wheel is braked and inhibiting means for inhibiting operation of said auxiliary means when the coefficient of friction therebetween becomes lower than a predetermined value.

13. A system according to claim 12 wherein said friction detecting means includes a deceleration sensor for detecting the deceleration of the vehicle body of said vehicle.

* * * * *